United States Patent [19]

Barrus et al.

[11] Patent Number: 4,770,845

[45] Date of Patent: Sep. 13, 1988

[54] SELF-ACTUATING REACTOR SHUTDOWN SYSTEM

[75] Inventors: Donald M. Barrus, San Jose; Willian A Brummond, Livermore; Leslie F. Peterson, Danville, all of Calif.

[73] Assignee: The United States of America as represented by the United States Department of Energy, Washington, D.C.

[21] Appl. No.: 270,672

[22] Filed: Jun. 4, 1981

[51] Int. Cl.$^4$ .......................... G21C 7/00; G01K 7/00
[52] U.S. Cl. .................................... 376/336; 376/230; 376/243; 376/321; 313/310; 310/306; 374/174; 337/306
[58] Field of Search ............... 376/336, 337, 230, 234, 376/321; 313/310; 310/306; 374/174; 337/306, 327, 120

[56] References Cited

U.S. PATENT DOCUMENTS

| | | |
|---|---|---|
| 2,586,291 | 2/1952 | Bender ................................ 313/310 |
| 2,779,728 | 1/1957 | Zinn et al. . |
| 3,038,846 | 6/1962 | Yeomans et al. . |
| 3,121,048 | 2/1964 | Haas .................................... 376/321 |
| 3,177,124 | 4/1965 | Eggen . |
| 3,196,295 | 7/1965 | Oppen et al. ........................ 313/310 |
| 3,223,589 | 12/1965 | Ziegler . |
| 3,231,473 | 1/1966 | Hennig . |
| 3,264,952 | 8/1966 | Winders . |
| 3,321,372 | 5/1967 | Challender . |
| 3,324,006 | 6/1967 | Challender et al. . |
| 3,359,172 | 12/1967 | Olsson . |
| 3,432,387 | 3/1969 | Jonsson . |
| 3,462,345 | 8/1969 | Jabsen . |
| 3,532,960 | 10/1970 | Webb .................................. 310/306 |
| 3,533,912 | 10/1970 | Dempsey . |
| 3,573,166 | 3/1971 | Germer . |
| 3,940,310 | 2/1976 | Irion et al. . |
| 4,076,583 | 2/1978 | Ash et al. ............................ 376/230 |
| 4,138,320 | 2/1979 | Grantz . |
| 4,139,414 | 2/1979 | Giuggio et al. ..................... 376/337 |
| 4,158,602 | 6/1979 | Minnick . |
| 4,187,145 | 2/1980 | Noyes et al. . |

FOREIGN PATENT DOCUMENTS

| | | |
|---|---|---|
| 897455 | 5/1962 | United Kingdom ................ 376/337 |
| 1103878 | 2/1968 | United Kingdom ................ 376/230 |

OTHER PUBLICATIONS

"Study of Thermionic Converter Reactor Control Switch", G.E. Co. Summary Report 6/6/80, Hatch et al.
Report XL-895-00453, "The Application of a Self-Actuating Shutdown System (SASS) to a Gas-Cooled Fast Reactor (GCFR)", 9/80, G.E. Co., Germer et al.

Primary Examiner—Harvey E. Behrend
Attorney, Agent, or Firm—L. E. Carnahan; Roger S. Gaither; Judson R. Hightower

[57] ABSTRACT

A control system for the automatic or self-actuated shutdown or "scram" of a nuclear reactor. The system is capable of initiating scram insertion by a signal from the plant protection system or by independent action directly sensing reactor conditions of low-flow or over-power.

Self-actuation due to a loss of reactor coolant flow results from a decrease of pressure differential between the upper and lower ends of an absorber element. When the force due to this differential falls below the weight of the element, the element will fall by gravitational force to scram the reactor.

Self-actuation due to high neutron flux is accomplished via a valve controlled by an electromagnet and a thermionic diode. In a reactor over-power, the diode will be heated to a change of state causing the electromagnet to be shorted thereby actuating the valve which provides the changed flow and pressure conditions required for scramming the absorber element.

16 Claims, 2 Drawing Sheets

SELF-ACTUATING REACTOR SHUTDOWN SYSTEM

BACKGROUND OF THE INVENTION

The invention described herein arose under Contract No. DE-AT03-76SF71032 between the U.S. Department of Energy and the General Electric Company.

The invention relates to control systems for nuclear reactors, particularly to a control system for a liquid metal cooled reactor, and more particularly to a self-actuated control system responsive to low-flow or over-power conditions of the reactor.

The use of control systems to regulate the reactivity of a nuclear reactor by varying the location of control (neutron absorber) elements with respect to the reactive core is well known. With a view toward the possibility of an emergency condition arising, as by an unexpected drop in coolant flow or rise in reactivity, such control systems include arrangements for "scramming" the control rods; i.e., for rapid insert of the absorber elements into the core to quickly shut down the reactor.

With the advent of the liquid metal fast breeder reactor (LMFBR), a need for faster, less complex, more reliable control rod scram or shutdown systems has become apparent, whereby the reactivity of the reactor can be quickly shut down.

More recent efforts have been directed to the desirability of utilizing secondary or alternate control systems of the self-actuating type which would make an LMFBR inherently safe. Such alternate or self-actuating systems provide control without reliance on the primary reactor control system or plant operators, while being capable of actuation by the plant operators. These efforts have resulted in systems which sense the reactor flow rate and actuate when the flow drops below a predetermined level, or measure the neutron flux or reactivity level of the reactor and actuate when the reactivity exceeds a specified level. The following exemplifies various operator-actuated and/or self-actuated prior art control systems.

U.S. Pat. No. 4,158,602 issued June 19, 1979, to L. E. Minnick discloses a self-actuating scram system triggered by a loss of primary coolant flow which supports the absorber rods above the reactor core region. A loss of primary coolant flow causes a decrease in the supporting pressure on the absorber rods allowing the rods to fall into the core region, thus scramming the reactor.

U.S. Pat. No. 3,359,172 issued Dec. 19, 1967, to C. S. Olsson discloses a reactor shutdown system employing an electromagnet-operated valve to terminate coolant flow. Absorber rods, normally suspended above the core, will fall into the core region upon loss of coolant flow.

U.S. Pat. No. 3,462,345 issued Aug. 19, 1969, to F. S. Jabsen discloses a reactor control system utilizing coolant pressure to support control rods above the reactor core region. Upon loss of coolant flow, the control rods fall under the influence of gravity into the core region effecting a self-actuated scram. A scram may also be initiated by de-energizing an electromagnet coupled to a valve disposed in the coolant flow line. Actuation of the valve cuts off coolant flow, terminating the support pressure on the control rod, thus allowing the rod to fall under the influence of gravity into the core region.

U.S. Pat. No. 4,187,145 issued Feb. 5, 1980, to R. C. Noyes et al discloses a scram release system in which control rods are supported by coolant pressure acting on a hydraulic latch plug. A reduction in coolant flow rate causes a reduction in pressure across the plug, resulting in release of absorber material into the core under the influence of gravity as well as under the influence of high-pressure fluid applied to the top of the absorber material by a conduit opened by the release of the plug.

U.S. Pat. No. 4,138,320 issued Feb. 6, 1979, to A. L. Grantz discloses a fluidic control module which senses reactor coolant flow rate and/or flux changes and varies the flow rate accordingly. The flow of coolant supports absorber materials, and when coolant flow is restricted the absorber material falls into the reactor core region. In addition, a flux sensor is employed to cause the thermal expansion of a metallic orifice upon the sensing of an increase in neutron flux. Expansion of the metallic orifice triggers a scram release mechanism.

U.S. Pat. No. 3,177,124 issued Apr. 6, 1965, to D. T. Eggen et al discloses a reactor control device triggered by the melting of a solder joint. Upon experiencing an increase in neutron flux, a layer of uranium abutting the solder joint begins to heat the joint until it melts, releasing absorber material.

Thus, while various approaches have been developed for reactor control, a need still exists for a self-actuated control system which is failsafe; reliable; testable in the core at shutdown; resettable; and capable of actuating, upon sensing, either the initiation of a transient under-cooling (loss of flow) event, or a transient over-power (increased reactivity) event, as well as being capable of response to reactor coolant over-temperature and actuation by plant operators.

RELATED APPLICATION

The present invention is in the same general field of art as U.S. application Ser. No. 270,682, filed June 4, 1981, and assigned to the assignee of this application.

SUMMARY OF THE INVENTION

It is an object of the present invention to provide a self-actuated control system for nuclear reactors.

It is a further object of the invention to provide a self-actuating reactor shutdown system responsive to loss of reactor coolant flow or high-neutron flux.

Another object of the invention is to provide a reactor shutdown system which utilizes pressure differential of reactor coolant across a neutron absorber element and/or an electromagnetic valve actuated by a thermionic diode in response to neutron-flux level.

Other objects of the invention will become apparent from the description of the invention and the accompanying drawings illustrating the invention.

The present invention involves a hydrostatic supported absorber/self-actuating reactor shutdown system which is particularly applicable for a liquid metal fast breeder reactor, but is not limited to this specific type of reactor. The system is capable of initiating scram insertion of an absorber element into the reactor core by a signal from the plant protection system, or by independent action by directly sensing reactor conditions of low flow or over-power. By these means, this system achieves a degree of independence from reactor operational instrumentation and control systems.

More specifically, upon loss or reduction of reactor coolant flow, a decrease in pressure differential across the neutron absorber element which produces a force less than the weight of the absorber element, allows the element to begin to drop. Equalization of the pressures across the element allows the element to fall under full gravitational force. The reduction in coolant flow for actuating the absorber element may result from an undesirably high neutron flux, or coolant over-temperature, which actuates a thermionic diode to control an electromagnetically actuated valve which, in turn, controls the coolant flow across the absorber element. The thermionic diode, which is uranium blanketed, changes state (becomes conductive) as the uranium blanket is heated by the high-neutron flux or by high coolant temperature, causing the electromagnet to be shorted; and the valve element, formerly held in open condition by magnetic attraction, closes off the flow of coolant across the absorber element.

It is thus seen that the invention in its broadest sense involves a shutdown system for a nuclear reactor, including means for retaining neutron absorbing material above a core region of the reactor, the retaining means being responsive to a pressure differential created by the coolant flow across the neutron absorbing material, and means responsive to neutron flux or coolant temperature for controlling the coolant flow.

DETAILED DESCRIPTION OF THE INVENTION

The present invention is directed to a self-actuated reactor shutdown system (SASS) utilizing hydrostatic supported absorber elements. While the invention is particularly applicable for use in a liquid metal fast breeder reactor (LMFBR), it can be utilized in other types of reactors, such as the gas-cooled fast reactor (GCFR). A SASS is defined as a control-rod system that can scram the reactor automatically without either a signal from an external control circuit or an operator action. Initiation of the scram in accordance with the present invention is entirely from direct sensing of inadequate flow and/or an over-power condition. Particular requirements of a SASS are as follows:

1. It must be capable of operating automatically;
2. It must be failsafe, such that no malfunction of the SASS can cause a hazardous condition;
3. It must not impose excessive restrictions on normal operation of the reactor;
4. It must have as little as possible adverse effect upon plant availability; and
5. It must contribute substantially to the overall safety of the reactor.

The SASS of this invention satisfies each of the above requirements and employs reactor pressure differentials and a thermionic diode to activate a control rod scram without a signal from the reactor operating control system. The use of hydrostatic supported absorber elements wherein, during normal operation, the control rod is held above the reactor core and is dropped into the core when the hydrostatic pressure is decreased below a specified minimum, such as the weight of the absorber element, are known in the art as pointed out above. While the present invention utilizes this known principle of operation, the invention also incorporates the use of a thermionic diode which is responsive to high neutron flux (over-power) and coolant temperature (undercooling) conditions of the reactor. The diode functions to control an electromagnetically attracted slide valve which, in turn, controls the hydrostatic pressure supporting the absorber elements, whereby the SASS of this invention provides a system responsive to both low-coolant flow, high-neutron flux (over-power) and coolant over-temperature.

The SASS incorporating the present invention cannot be overridden by external control, either from operators or plant control systems, with the intent to hold off a scram. Further, the SASS of this invention is able to be restored to operational or cocked condition only by deliberate operator action, and only when the reactor conditions have been corrected and will permit reactivation. In addition, the SASS of this invention is responsive to scram signals generated by the plant protection systems.

Figure 1:
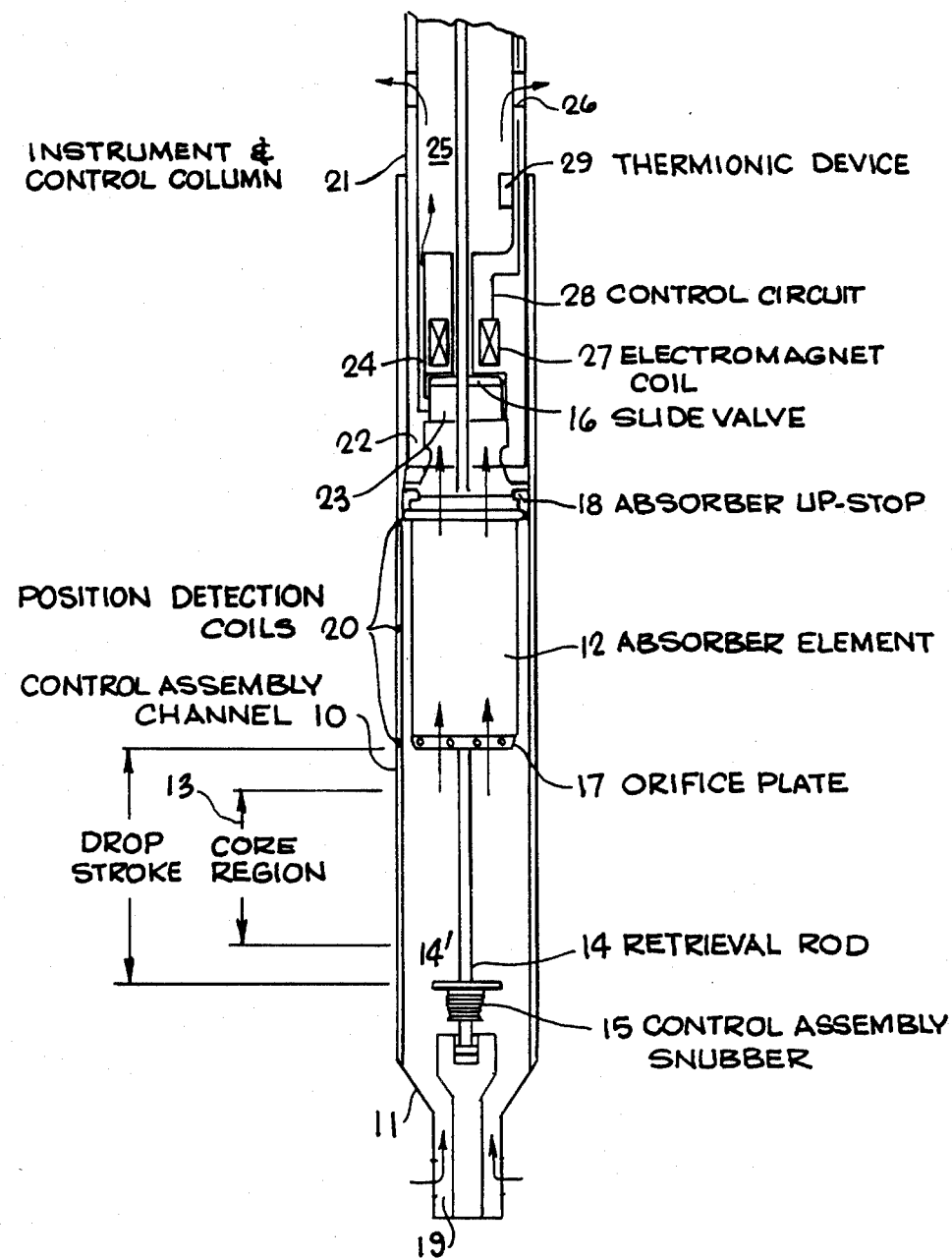
FIG. 1 illustrates a general arrangement of a self-actuated shutdown system positioned within a reactor core.

Referring now to FIG. 1, a SASS incorporating the present invention is illustrated. While not shown, it is known in the art that control rods or elements of the SASS are positioned within a fuel bundle containing a plurality of fuel rods. The fuel bundles are located in the core of the reactor, while the control rod or neutron absorber element of that bundle is maintained above the core during normal reactor operation. As shown in FIG. 1, the SASS comprises a control assembly channel or casing 10 secured at the lower end to an inlet nozzle 11 and provided with an absorber element 12 composed of neutron absorbing material, as known in the art, and mechanism for controlling the location of the element 12 with respect to a reactor core region indicated at 13. A retriever rod 14 is positioned in casing 10 and extends through element 12 and longitudinally through the casing. The lower end of rod 14 is provided with a ring or member 14' which serves to raise element 12 to its ready position, and cooperates with a control assembly snubber, or dash-pot 15, or other kinetic energy absorbing means to slow the descent of the absorber element 12 after it enters the core region 13 and to return the element 12 to its ready position. The upper end of retriever rod 14 is adapted to be connected to drive grapple or mechanism (not shown) supported on the reactor top shield to perform upward movement of the absorber element and to reposition a magnetically retained slide valve 16, as described hereinafter.

The absorber element 12 is provided at the lower end with plate 17 having a plurality of orifices to control cooling flow therethrough. As shown, the element 12 is in its ready or cocked position above the core region 13 and is retained hydrostatically against an absorber up-stop or face seal 18 fixedly secured to casing 10. Element 12 is held against up-stop 18 by the pressure differential across element 12 created by coolant flowing upwardly under pressure through inlet 19 in nozzle assembly 11 from a pressure plenum (not shown), as indicated by the flow arrows.

The pressure differential which retains the absorber element 12 against up-stop or face seal 18 is produced, as known in the art, by the difference in surface area at the top and bottom of the elements 12 on which the pressurized coolant may act. Since the surface area at the lower end of the element 12 is greater than that at the upper end thereof, due to the element abutting against up-stop 18, the element 12 is hydrostatically retained in its up or cocked position. Any decrease in pressure differential below the minimum required to support the weight of element 12 will cause the element to fall towards core region 13. As soon as the element is separated from the face seal or up-stop 18, essentially all the pressure differential is lost, since the coolant can act against the entire upper surface of the element causing the pressure above and below the element to equalize, and the element will fall freely into the core region 13 under the influence of gravity, the drop stroke of element 12 being illustrated by legend. The fall of the absorber element 12 will be retarded only by flow resistance of the displaced fluid with casing 10, and near the bottom of its stroke or fall by the snubber or dashpot assembly 15 for absorbing the kinetic energy.

The pressure differential holding the element 12 in its upper position is a function of the total core pressure drop and the relative flow resistances of any active cooling passages in the absorber element and of the inlet orifice. Since pressure drop across the core region 13 varies with the square of the flow, the available presure will decrease rapidly as flow decreases.

A valve (not shown) for by-passing the face seal or up-stop 18 can be utilized to provide a control element scram as a result of excessive core outlet temperature. Such a valve is normally closed, and is designed to open on an over-temperature signal. It can be actuated, for example, by melting a fusible material, a thermionic diode without fissionable material, or by an electromagnetic device, as known in the art.

A mechanical drive or grapple, not shown, is connected to the upper end of retriver rod 14, as set forth above, for raising the absorber element 12 and holding it in its upper position until adequate coolant flow is established to produce the pressure differential discussed above. The grapple must be released before reactor operation. Release of the grapple can be assured after disconnecting by raising the grapple to a higher position.

To enable the plant operator to know the location of the absorber element 12 with respect to the core region 13, a plurality of position detection coils 20 (three in this embodiment) are positioned on the casing 10 along the length of the element 12. It is readily seen that the location of element 12 can be determined by the readout from the coils 20. Should the element 12 be in a partially inserted (lower position), for example the readout from the upper coil 20 would differ from that of the two lower coils. Coil readout apparatus is well known in the art and further description of such is deemed unnecessary.

Positioned above the up-stop 18 is an instrument and control column 21, including a housing 22 which, at the lower end thereof, is secured in casing 10 and provided with seal means for preventing coolant flow therebetween. Housing 22 includes a chamber 23 within which slide valve 16 is movably positioned. A fluid or coolant passage 24 extends from chamber 23 to an outlet chamber 25 in control column 21, which is provided with coolant flow outlet openings 26. An electromagnetic coil 27 is positioned above slide valve 16 and is connected via an electromagnetic control circuit indicated at 28 to a power supply, not shown. A uranium-blanketed thermionic device 29 mounted in chamber 25 and secured to control column 21 is electrically connected in control circuit 28 so as to be in parallel with coil 27 and is responsive to neutron flux. The electromagnetic coil 27 is normally energized from above the reactor head via control circuit 28 such that slide valve 16 is magnetically retained in its upper position, as shown, whereby coolant flows through passage 24 into chamber 25 and out openings 26, as indicated by the flow arrows. In the event of reactor over-power (high-neutron flux), the thermionic device 29 is heated to a change of state. This change of state causes the electromagnetic coil 27 to be short-circuited and lose its holding power, whereupon the slide valve 16 drops by gravitational force and closes off the flow through passage 24. This change (decrease) in coolant flow above absorber element 12 causes a decrease in the differential pressure across element 12 such that the holding pressure is less than the weight of the element, whereby element 12 moves downwardly with respect to face seal or up-stop 18. As described above, this initial downward movement or drop of absorber element 12 results in a loss of pressure differential or equalization of the coolant pressure above and below the element such that the element drops into reactor core region 13 under full gravitational force.

When normal reactor flow conditions have been reestablished, or there has been a sufficient reduction of the neutron flux, the absorber element is returned to its ready or cocked position by means of the retrieval rod 14, as described above. In addition, the retrieval process returns the slide valve 16 to its position against the electromagnet and is retained in the upper section of chamber 23 by magnetic attraction when the electromagnetic coil 27 is re-energized. The retrieval rod 14 is then lowered to permit the full drop stroke of the absorber element 12. The retrieval rod 14 is provided with a member, not shown, such as a ring, which is located on rod 14 so as to simultaneously position slide valve 16 at the top of chamber 23 adjacent electromagnetic coil 27 and element 12 against up-stop 18.

Figure 3:
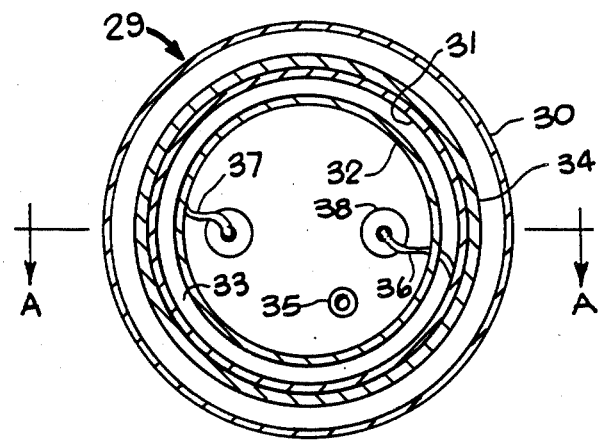
FIG. 3 is a view of the thermionic diode of FIG. 2 taken along the lines B—B.
Figure 2:
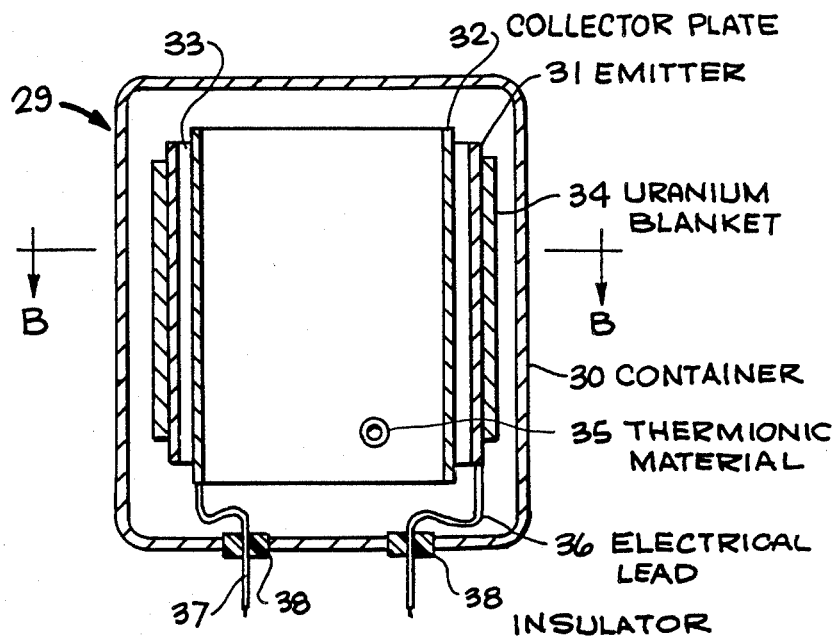
FIG. 2 is a cross-sectional view, taken along line A—A of FIG. 3, of an embodiment of a thermionic diode of the reactor shutdown system in accordance with the invention.

The thermionic device 29 of FIG. 1 is embodied in FIGS. 2 and 3 as a thermionic diode 29. The diode 29 consists of a sealed container 30 having therein an emitter 31 and a collector plate 32 separated by a gap 33, with a uranium blanket 34 positioned around emitter 31 which causes heating of diode 29 due to neutron flux, and a quantity of thermionic material 35 located within sealed container 30. Emitter 31 and collector plate 32 are connected to an electrical potential (control circuit 28), as known in the art, via electrical leads 36 and 37, respectively, which extend through insulators 38 in container 30.

By way of example, the diode 29 may be constructed of the following material: container 30 is of stainless steel; emitter 31 is of molybdenum with a diameter of 0.750 in. and wall thickness of 0.50 in.; collector plate 32 is of molybdenum with a diameter of 0.450 in. and wall thickness of 0.10 in.; gap 33 is in the range of 0.10 in.; uranium blanket 34 has a wall thickness of 0.10 in.; thermionic material 35 may be cesium or other metalic vapor at operational temperatures. The electric leads 36 and 37 are of copper; and the insulators 38 are of alumina.

The thermionic material 35 is tailored to ionize at a selected temperature, for example, in the range of 1000° F. to 1100° F. An electrical potential, such as 10 to 15 volts, is applied to the emitter 31 and collector plate 32 and when the ionization temperature of the thermionic material 35 is reached, due to reactor over-power condition (high neutron flux) or to undesirable coolant temperature conditions, the material changes from high resistance to low resistance, thereby conducting most of the available current and, in effect, short-circuiting the electromagnetic coil 27 in FIG. 1 which is connected in parallel with the diode 29, via control circuit 28, as set forth above.

It has thus been shown that the present invention provides a self-actuating shutdown system (SASS) for nuclear reactors, particularly for an LMFR, which is responsive to low coolant flow and/or high-neutron flux (over-power) and/or reactor coolant temperature (under-cooling) conditions of the reactor. The SASS of this invention satisfies each of the requirements outlined above for such a system.

The thermionic diode also may be utilized to cause self-actuation of the control element due to reactor coolant over-temperature. While not shown, this may be accomplished via a coolant flow control valve controlled by an electromagnet and a thermionic diode. In a reactor over-temperature condition, the diode will be heated by the coolant to a change of state causing the electromagnet to be shorted thereby actuating the valve which provides a changed flow and pressure condition required for scramming the absorber element.

While a particular embodiment of the invention has been illustrated and described, modifications will become apparent to those skilled in the art, and it is intended to cover in the appended claims all such modifications as come with the scope of the invention.

What we claim is:

1. In a self-actuated reactor shutdown system utilizing a thermionic means responsive to at least coolant temperature and utilizing reactor coolant differential pressure for controlling the location of a neutron absorber element with respect to a reactor core region and for effecting release of the absorber element, the improvement comprising: electromagnetic means for controlling reactor coolant flow and coolant pressure differential across the absorber element, and thermionic means responsive to at least reactor coolant over-temperature conditions and operatively connected to said electromagnetic means for short-circuiting said electromagnetic means causing a change in coolant flow and a resulting decrease of the differential pressure across the absorber element allowing the element to drop into the reactor core region by gravitational force.

2. The improvement of claim 1, additionally including means for restoring the absorber element and a member of the electromagnetic means to a ready position wherein the absorber element is retained exterior of the reactor core region and the electromagnetic means allows flow of reactor coolant past said absorber element which establishes a differential pressure across the element which retains said element exterior of said core region, whereafter said restoring means can be removed from said absorber element and said electromagnetic means.

3. The improvement of claim 2, wherein said restoring means comprises a retriever rod extending through said absorber element and said electromagnetic means and provided with members positioned in spaced relation to contact said absorber element and said member of said electromagnetic means, and means for moving said retriever rod whereby said absorber element and said member of said electromagnetic means can be moved to the ready position.

4. The improvement of claim 1, wherein said electromagnetic means comprises an electromagnetic coil operatively connected to a power source, and a magnetically attracted slide valve.

5. The improvement of claim 4, wherein said electromagnetic coil is connected to a power source via a control circuit, and wherein said thermionic means is connected in said control circuit so as to be electrically in parallel with said electromagnetic coil.

6. The improvement of claim 5, wherein said thermionic means is a thermionic diode.

7. The improvement of claim 6, wherein said thermionic diode is provided with a uranium blanket extending therearound.

8. The improvement of claim 1, wherein said thermionic means consists of a uranium blanketed thermionic diode connected electrically in parallel with said electromagnetic means, whereby heating of said thermionic diode due to at least reactor coolant over-temperature conditions causes material therein to change state thereby effecting a short-circuiting of said electromagnetic means.

9. The improvement of claim 8, wherein said uranium-blanketed thermionic diode consists of a sealed container having therein an emitter, a collector plate positioned within and spaced from said emitter, a uranium blanket positioned around the exterior of said emitter, electrical leads operatively extending through said container and connected to said emitter and said collector plate, and a quantity of thermionic material located within said collector plate, whereby heating of said diode by at least reactor coolant over-temperature conditions causes said thermionic material to change state from high-electrical resistance to low-electrical resistance, thereby conducting available current away from said electromagnetic means effecting a short-circuiting thereof.

10. A self-actuating reactor shutdown system comprising: a longitudinally extending casing adapted to extend through a reactor core region and having a coolant inlet at one end and a control assembly positioned in the opposite end, a neutron absorber element having coolant flow passageways therethrough located in said casing intermediate said coolant inlet and said control assembly, an absorber up-stop secured to an inner surface of said casing adjacent said control assembly, said control assembly including a housing having a chamber adjacent said up-stop and a coolant passage connecting said chamber with a coolant outlet, an electromagnetically actuated slide valve positioned in said chamber, an electromagnetic coil located adjacent said chamber and adapted to be connected to an associated power source via a control circuit, and a thermionic means connected electrically to said electromagnetic coil, whereupon under normal reactor operating conditions said absorber element hydrostatically is retained against said up-stop in a ready position exterior of the core region by the pressure differential across the absorber element created by coolant flow, and upon loss of sufficient coolant flow to reduce the pressure differential below a specified amount the absorber element drops into the core region by gravitational force, and upon an over-power and/or coolant over-temperature condition the thermionic means causing short-circuiting of said electromagnetic coil causing said slide valve to cover said coolant passage thereby reducing coolant flow past said absorber element resulting in an equalization of the differential pressure across said absorber element and allowing said element to drop into the core region by gravitational force.

11. The system of claim 10, additionally including kinetic energy absorbing means positioned in said casing adjacent said coolant inlet end thereof to retard the fall of said absorber element.

12. The system of claim 10, additionally including retriever means for returning said absorber element into abutment with said up-stop and returning said slide valve to a position for magnetic attraction thereof by said electromagnetic coil.

13. The system of claim 10, wherein said thermionic means consists of a thermionic diode.

14. The system of claim 13, wherein said thermionic diode incorporates a uranium blanket.

15. The system of claim 10, wherein said thermionic means consists of a uranium blanketed thermionic diode containing thermionic material which upon heating to a specified temperature changes from high resistance to low resistance thereby effecting a short-circuiting of said electromagnetic coil causing loss of sufficient magnetic attraction of said slide valve allowing said slide valve to move by gravitational force to block flow through said coolant passage.

16. The system of claim 10, additionally including a plurality of position detection coils positioned on said casing for determining the location of said absorber element.

* * * * *